(12) United States Patent
Zhao et al.

(10) Patent No.: US 10,521,499 B2
(45) Date of Patent: Dec. 31, 2019

(54) METHOD AND DEVICE FOR EDITING DATA

(71) Applicants: ZHUHAI KINGSOFT OFFICE SOFTWARE CO., LTD, Guangdong (CN); BEIJING KINGSOFT OFFICE SOFTWARE CO., LTD, Beijing (CN); GUANGZHOU KINGSOFT MOBILE TECHNOLOGY CO., LTD, Guangdong Province (CN)

(72) Inventors: Yongkui Zhao, Guangdong (CN); Yong Zhuang, Guangdong (CN)

(73) Assignees: ZHUHAI KINGSOFT OFFICE SOFTWARE CO., LTD. (CN); BEIJING KINGSOFT OFFICE SOFTWARE, INC (CN); GUANGZHOU KINGSOFT MOBILE TECHNOLOGY CO., LTD (CN)

( * ) Notice: Subject to any disclaimer, the term of this patent is extended or adjusted under 35 U.S.C. 154(b) by 141 days.

(21) Appl. No.: 14/804,931

(22) Filed: Jul. 21, 2015

(65) Prior Publication Data
US 2016/0132474 A1 May 12, 2016

(30) Foreign Application Priority Data
Nov. 7, 2014 (CN) .......................... 2014 1 0629559

(51) Int. Cl.
*G06F 17/24* (2006.01)
(52) U.S. Cl.
CPC .................................... *G06F 17/24* (2013.01)

(58) Field of Classification Search
None
See application file for complete search history.

(56) References Cited

U.S. PATENT DOCUMENTS 6,449,617 B1 * 9/2002 Quinn ................. G06F 9/44505
9,229,920 B1 * 1/2016 Fiedler .................... G06F 17/24
(Continued)

*Primary Examiner* — Howard Cortes
(74) *Attorney, Agent, or Firm* — Bracewell LLP; Brad Y. Chin

(57) ABSTRACT

Embodiments of the invention provide a method and a device for editing data. According to at least one embodiment, the method includes the steps of receiving a document launch instruction issued by a user, and reading a preset set of files according to the received document launch instruction. The preset set of files includes an inventory file and a HTML data file, wherein the inventory file is used to describe a launch identification of a user interface to which the HTML data file corresponds, and the HTML data file includes identification information of data to be edited. The method further includes displaying on a user interface the launch identification of the user interface to which the HTML data file corresponds according to the inventory file, receiving an operation of the user for triggering the launch identification, and displaying the user interface to which the HTML data file corresponds. The user interface includes an operation identification of the data to be edited. Further, the method includes receiving an operation of the user for triggering the operation identification, calling a preset editing interface, loading the data to be edited according to the identification information of the data to be edited, and presenting to the user an editing user interface for the data to be edited.

6 Claims, 6 Drawing Sheets

(56) References Cited

U.S. PATENT DOCUMENTS

| | | | | |
|---|---|---|---|---|
| 2005/0041040 A1* | 2/2005 | Fukuda | ............... | G06F 17/212 |
| | | | | 345/619 |
| 2009/0235158 A1* | 9/2009 | Rosenstein | ............ | G06F 17/24 |
| | | | | 715/234 |
| 2010/0318894 A1* | 12/2010 | Billharz | ............... | G06F 17/24 |
| | | | | 715/234 |
| 2011/0252304 A1* | 10/2011 | Lemonik | ............ | G06F 17/2247 |
| | | | | 715/234 |
| 2011/0252339 A1* | 10/2011 | Lemonik | ............ | G06F 17/2288 |
| | | | | 715/753 |
| 2012/0084688 A1* | 4/2012 | Robert | ............... | G06F 3/04817 |
| | | | | 715/769 |
| 2012/0117194 A1* | 5/2012 | Huang | ............... | G06F 17/2288 |
| | | | | 709/219 |
| 2013/0191720 A1* | 7/2013 | Simons | ............ | G06F 17/30882 |
| | | | | 715/234 |
| 2013/0227396 A1* | 8/2013 | Chinnathambi | ...... | G06F 17/212 |
| | | | | 715/235 |
| 2014/0237350 A1* | 8/2014 | Ryall | ................... | H04L 65/403 |
| | | | | 715/234 |
| 2015/0193510 A1* | 7/2015 | Raess | ............... | G06F 17/30554 |
| | | | | 707/727 |
| 2015/0213259 A1* | 7/2015 | Du | ..................... | H04L 63/1466 |
| | | | | 726/27 |
| 2015/0301989 A1* | 10/2015 | Xin | ..................... | G06F 17/214 |
| | | | | 715/234 |
| 2017/0270083 A1* | 9/2017 | Pruitt | ............... | G06F 17/30896 |

* cited by examiner

METHOD AND DEVICE FOR EDITING DATA

CROSS REFERENCE TO RELATED APPLICATION

This application claims the benefit of and priority under 35 U.S.C. § 119 to Chinese Patent Application No. CN 201410629559.0, entitled "METHOD AND DEVICE FOR EDITING DATA," filed on Nov. 7, 2014, which is hereby incorporated by reference in its entirety into this application.

BACKGROUND

Field of the Invention

Embodiments of the invention relate to the field of office automation, and in particular, to a method and a device for editing data.

Description of the Related Art

Nowadays, more and more enterprises start to establish their own information systems by using the office automation technology, so as to achieve the functions such as process approval, cooperation, document management, information center, project management or the like. The advantages thereof include: improving office efficiency and enabling staffs of an enterprise to share information conveniently and rapidly, and to cooperate with each other efficiently; and it can enable fast and all-aspect information acquisition and processing, so as to provide scientific basis for the management and decision-making of an enterprise.

In the existing office automation technology, if a user wants to edit data in an information system, the user needs to firstly export this data from the information system manually and then load the data by using corresponding office software before the user can edit the data. For example, in the case that a document needs to be signed with an electronic signature of an enterprise, the conventional technology involves firstly downloading the electronic signature from the information system of the enterprise, and then inserting the electronic signature into the document. Such operations are tedious and the office efficiency is low.

SUMMARY

Accordingly, embodiments of the invention provide a method and a device for editing data.

In accordance with at least one embodiment, there is provided a method for editing data, including the steps of receiving a document launch instruction issued by a user, and reading a preset set of files according to the received document launch instruction, the preset set of files including an inventory file and a HTML data file. According to at least one embodiment, the inventory file is used to describe a launch identification of a user interface to which the HTML data file corresponds, and the HTML data file includes identification information of data to be edited. The method further includes displaying, on the user interface, the launch identification of the user interface to which the HTML data file corresponds according to the inventory file receiving an operation of the user for triggering the launch identification, and displaying the user interface to which the HTML data file corresponds. According to at least one embodiment, the user interface includes an operation identification of the data to be edited. Further, the method includes receiving an operation of the user for triggering the operation identification, calling a preset editing interface, loading the data to be edited according to the identification information of the data to be edited, and presenting to the user an editing user interface for the data to be edited.

In accordance with at least one embodiment, the HTML data file further includes a preset editing instruction, and after loading the data to be edited, the method further includes editing the data to be edited according to the preset editing instruction in the HTML data file to obtain a first editing result. According to at least one embodiment, the step of presenting to the user an editing user interface for the data to be edited is specifically presenting to the user an editing user interface comprising the first editing result.

In accordance with at least one embodiment, after presenting to the user the editing user interface for the data to be edited, the method further includes receiving a first editing instruction input on the editing user interface by the user, and executing an editing operation on the data to be edited.

In accordance with at least one embodiment, after presenting to the user the editing user interface comprising the first editing result, the method further includes receiving a second editing instruction input on the editing user interface by the user, and executing an editing operation on the data to be edited.

In accordance with at least one embodiment, the data to be edited is stored in a particular storage location in a target information system or in a local particular storage location.

In accordance with at least one embodiment, after executing the editing operation on the data to be edited, the method further includes transmitting the edited data to the particular storage location in the target information system or the local particular storage location.

In accordance with at least one embodiment, the editing operation is a persistent editing operation or a non-persistent editing operation.

In accordance with another embodiment, there is provided a device for editing data, including a launch-instruction receiving module, which is used to receive a document launch instruction issued by a user, and a file-set reading module, which is used to read a preset set of files according to the received document launch instruction. According to at least one embodiment, the preset set of files includes an inventory file and a HTML data file, the inventory file is used to describe a launch identification of a user interface to which the HTML data file corresponds, and the HTML data file includes identification information of data to be edited. The device further includes a launch-identification displaying module, which is used to display on a user interface the launch identification of the user interface to which the HTML data file corresponds according to the inventory file. Further, the device includes a user-interface displaying module, which is used to receive an operation of the user for triggering the launch identification, and to display the user interface to which the HTML data file corresponds. According to at least one embodiment, the user interface includes an operation identification of the data to be edited. Further, the device includes a data-to-be-edited loading module, which is used to receive an operation of the user for triggering the operation identification, call a preset editing interface, and load the data to be edited according to the identification information of the data to be edited. The device further includes an editing-user-interface presenting module, which is used to present to the user an editing user interface for the data to be edited.

In accordance with at least one embodiment, the device further includes a pre-editing module, and the HTML data file further includes a preset editing instruction. The pre-editing module is used to edit the data to be edited according to the preset editing instruction in the HTML data file after the data to be edited is loaded by the data-to-be-edited loading module to obtain a first editing result. The editing-user-interface presenting module is specifically used to present to the user an editing user interface including the first editing result.

In accordance with at least one embodiment, the device further includes a first editing module, which is used to receive a first editing instruction input on the editing user interface by the user and execute an editing operation on the data to be edited, after the editing user interface for the data to be edited is presented to the user by the editing-user-interface presenting module.

In accordance with at least one embodiment, the device further includes a second editing module, which is used to receive a second editing instruction input on the editing user interface by the user and execute an editing operation on the data to be edited, after the editing user interface comprising the first editing result is presented to the user by the editing-user-interface presenting module.

In accordance with at least one embodiment, the data to be edited is stored in a particular storage location in a target information system or in a local particular storage location.

In accordance with at least one embodiment, the device further includes a data transmitting module, which is used to transmit the edited data to the particular storage location in the target information system or the local particular storage location after the editing operation on the data to be edited is executed by the pre-editing module, the first editing module or the second editing module.

In accordance with at least one embodiment, the editing operation is a persistent editing operation or a non-persistent editing operation.

According to at least one embodiment, after receiving a document launch instruction issued by a user, a preset set of files is read, a launch identification of a user interface to which a HTML data file corresponds is displayed according to an inventory file in the set of files, and a user interface to which the HTML data file corresponds is displayed according to an operation of the user. Furthermore, after an operation identification of data to be edited included in the user interface is triggered by the user, a preset editing interface is called, the data to be edited is loaded according to identification information of the data to be edited, and an editing user interface for the data to be edited is presented to the user.

In comparison with the conventional art, a user does not need to first export data from a target information system manually, store the data locally, and then load said data by using corresponding office software, thus, embodiments of the invention, achieve more convenient operation and higher office efficiency. Furthermore, HTML is a standard technique of text format, which is independent from platform and hardware, thus, embodiments of the invention can be executed on any software and hardware platform. Therefore, the device, according to various embodiments of the invention, has wide applicability.

Various objects, advantages and features of the invention will become apparent from the following description of embodiments with reference to the accompanying drawings.

BRIEF DESCRIPTION OF DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
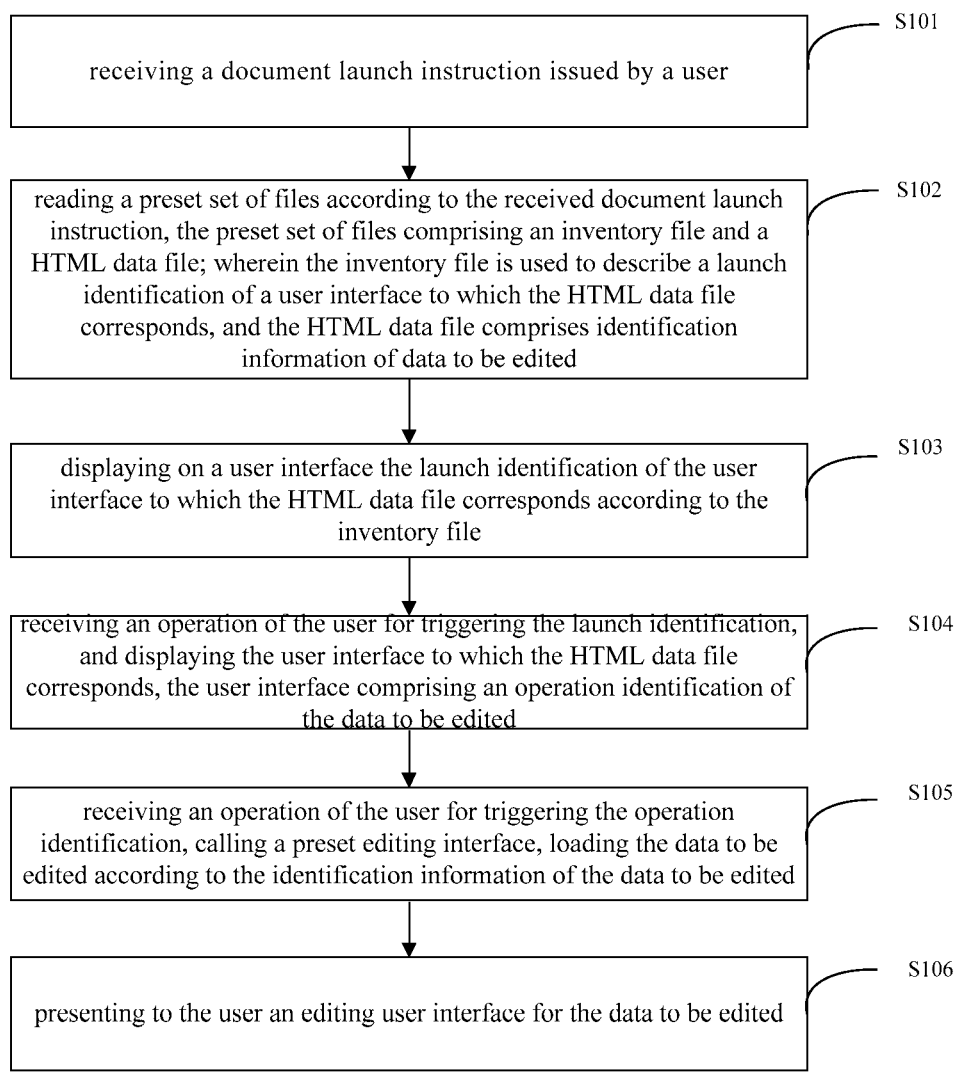
FIG. 1 is a flowchart of a first method for editing data according to an embodiment of the invention.

Advantages and features of the invention and methods of accomplishing the same will be apparent by referring to embodiments described below in detail in connection with the accompanying drawings. However, the invention is not limited to the embodiments disclosed below and may be implemented in various different forms. The embodiments are provided only for completing the disclosure of the invention and for fully representing the scope of the invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. According to at least one embodiment, the dimensions of some of the elements in the figures may be exaggerated relative to other elements to help improve understanding of embodiments of the invention. Like reference numerals refer to like elements throughout the specification.

Hereinafter, various embodiments of the invention will be described in detail with reference to the accompanying drawings.

First, a method for editing data according to various embodiments of the invention is described. According to at least one embodiment, there is provided a method including the steps of receiving a document launch instruction issued by a user, and reading a preset set of files according to the received document launch instruction. According to at least one embodiment, the preset set of files includes an inventory file and a HTML data file; wherein the inventory file is used to describe a launch identification of a user interface to which the HTML data file corresponds, and the HTML data file includes identification information of data to be edited. The method further includes the step of displaying, on a user interface, the launch identification of the user interface to which the HTML data file corresponds according to the inventory file, receiving an operation of the user for triggering the launch identification, and displaying the user interface to which the HTML data file corresponds. According to at least one embodiment, the user interface includes an operation identification of the data to be edited. Further, the method includes the step of receiving an operation of the user for triggering the operation identification, calling a preset editing interface, loading the data to be edited according to the identification information of the data to be edited, and presenting to the user an editing user interface for the data to be edited.

According to at least one embodiment, the executing subject of the method for editing data described above can be a plug-in of related office software which can be installed in an electronic device. The electronic device herein generally refers to a computer, a tablet computer, or a smart phone, as non-limiting examples, and the specific form of the electronic device is not needed to be limited according to embodiments of the invention.

According to at least one embodiment, through using the method described above, after receiving a document launch instruction issued by a user, the executing subject read a preset set of files, displays a launch identification of a user interface to which a HTML data file corresponds according to an inventory file in the set of files, and displays the user interface to which the HTML data file corresponds according to an operation of the user, after the user triggers an operation identification of data to be edited included in the user interface, the executing subject calls a preset editing interface, loads the data to be edited according to identification information of the data to be edited, and presents to the user an editing user interface for the data to be edited. In comparison with the conventional art, a user does not need to first export data from a target information system manually, store the data locally, and then load said data by using corresponding office software, thus, the method and device, according to various embodiments of the invention, achieve more convenient operation and higher office efficiency. Furthermore, HTML is a standard technique of text format, which is independent from platform and hardware, thus it can be executed on any software and hardware platform. Therefore, embodiments of the invention have wide applicability.

As shown in FIG. 1, embodiments of the invention provide a method for editing data, which include S101, receiving a document launch instruction issued by a user. According to at least one embodiment, the document launch instruction here is an operation issued by the user for launching related office software, or an operation of the user for triggering a preset document launch icon on the user interface of the related office software in the case that the related office software is already launched.

Taking WPS office software as an example of the related office software, the document launch instruction is, for example, a double-click operation of the user for launching the WPS office software, or an operation of the user for clicking a preset document launch icon on the user interface of the WPS office software which is already launched.

It should be noted that what is described above is only visualized description of the document launch instruction to make it convenient for those skilled in the art to understand this step. The specific form of the document launch instruction can be any form in the conventional art, and can be determined by those skilled in the art according to the actual situation, which is not specifically limited here in the invention.

According to at least one embodiment, the method includes S102, reading a preset set of files according to the received document launch instruction, in which the preset set of files includes an inventory file and a HTML data file. The inventory file is used to describe a launch identification of a user interface to which the HTML data file corresponds, and the HTML data file includes identification information of data to be edited.

According to at least one embodiment, the set of files mentioned here is provided by a target information system in advance, and is stored in a location pre-designated by the target information system and the related office software. As such, the executing subject can read the set of files provided by the target information system in advance from the designated location, after detecting a document launch instruction input by a user.

According to at least one embodiment, the set of files includes an inventory file and a HTML data file, wherein the inventory file is used to describe the launch identification of the user interface to which the HTML data file corresponds, and the HTML data file includes identification information of data to be edited.

According to at least one embodiment, the launch identification includes a launch icon of the user interface to which the HTML data file corresponds, which, for example, is a round icon or a triangle icon, as non-limiting examples. The launch identification also includes the name of the user interface to which the HTML data file corresponds, which, for example, is "inserting an image" or "document editing," as non-limiting examples. The specific form of the icon and the name are determined by those skilled in the art according to the actual situation, which is not specifically limited here in the invention.

According to at least one embodiment, the data to be edited is any data, such as graphic data, text data, or multimedia data, as non-limiting examples.

According to at least one embodiment, the identification information of the data to be edited is a link path of the data to be edited, and the link path is a local link path and is also be a network link path, which are determined depending on the specific implementation of the various embodiments of the invention during actual implementation, and are not specifically limited here in the invention.

According to at least one embodiment, the method further includes S103, displaying on a user interface the launch identification of the user interface to which the HTML data file corresponds according to the inventory file.

After the preset set of files is read, the launch identification of the user interface to which the HTML data file corresponds is displayed on the user interface of the related software according to the description of the inventory file. For example, if the inventory file describes that the icon of the launch identification is triangle and the name thereof is inserting an image, then a triangle icon is displayed on the user interface after the preset set of files is read. When a mouse pointer is hovered over the triangle icon, the name "inserting an image" to which the icon corresponds is displayed. It should be noted that the specific display form of the launch identification can be set by those skilled in the art, which is unnecessary to be limited in the invention.

Specific embodiments for displaying the user interface to which the HTML data file corresponds on the user interface are achieved by employing related technical solutions in the prior art, which is not specifically described here in the invention.

According to at least one embodiment, the method further includes S104, receiving an operation of the user for triggering the launch identification, and displaying the user interface to which the HTML data file corresponds, the user interface including an operation identification of the data to be edited.

According to at least one embodiment, the specific form of the operation of the user for triggering the launch identification is determined by those skilled in the art. For example, the most common form is single-clicking the launch identification or double-clicking the launch identification. Of course, other forms can be used, which is not specifically limited here in the invention. The operation identification of the data to be edited included in the user interface includes, for example, a name or an icon, as non-limiting examples, with reference to the launch identification described above.

According to at least one embodiment, the method further includes S105, receiving an operation of the user for triggering the operation identification, calling a preset editing interface, loading the data to be edited according to the identification information of the data to be edited.

When a user wants to edit the data to be edited, the user issues an operation for triggering the operation identification. For example, the most common operation is single-clicking the launch identification or double-clicking the launch identification. Of course, other forms can be used, which are not specifically limited here in the invention. After receiving the operation, the executing subject calls a disclosed and preset editing interface of the related office software, and then loads the data to be edited according to the identification information of the data to be edited included in the HTML data file. In an actual application, the executing subject calls the editing interface in the HTML data file by JavaScript language. Of course, other languages are used to call the interface, which are determined by those skilled in the art. It is appreciated that JavaScript language is a preferred embodiment because it is faster and more convenient than other existing languages.

There are a large number of editing interfaces provided by the related office software. Such editing interfaces are classified into three types, that is, data importing interface, data processing interface, and data exporting interface, wherein the data importing interface is used to import an image, a text, a multimedia, a watermark, or a structure, as non-limiting examples. According to at least one embodiment, the data processing interface is used to modify text content, text layout format, image size or image layout style, or data content, as non-limiting examples, and the data export interface is used to save a text, export an image, export a text, export a multimedia, export a watermark, or export a structure, as non-limiting examples. The editing interface is provided by the related office software, and is directly used in the present invention without being further limited.

It should be noted that the embodiments of the executing subject calling the editing interface and loading the data are achieved by using the related technical solutions in the conventional art, which are not specifically limited here in the invention.

According to at least one embodiment, the method includes S106, presenting to the user an editing user interface for the data to be edited.

According to at least one embodiment, after the data to be edited is loaded, the editing user interface including the data to be edited is displayed.

The solution described above will be further described below by a specific example during an actual application. In the example, the target information system can specifically be an enterprise information system, while the related office software can be WPS office software. The case is that a user wants to add an electronic signature into a document.

According to at least one embodiment, the process for achieving the technical solution of the present invention is as follows.

First, a preset set of files will be stored in a designated storage location by the enterprise information system. The preset set of files includes an inventory file and a HTML data file, wherein the inventory file is used to describe a launch identification of a user interface to which the HTML data file corresponds, and the HTML data file includes identification information of the electronic signature, wherein the launch identification is specifically a link path.

According to at least one embodiment, after a user starts the WPS office software, the executing subject reads the preset set of files, and displays on a user interface the launch identification of the user interface to which the HTML data file corresponds, wherein the launch identification includes, for example, an icon and a name. After the user clicking the icon of the launch identification, the user interface to which the HTML data file corresponds is displayed, on which an operation identification of the electronic signature, which comprises, for example, an icon and a name, is displayed. After the user clicks on the icon of the operation identification, the executing subject calls a preset editing user interface, such as an editing interface for inserting an image, in the HTML data file by JavaScript language, loads the electronic signature, including the displaying form, the displaying position, and the size of the electronic signature, according to identification information transmitted to the electronic signature, and then displays the electronic signature in the document.

It can be known from the description above that, after receiving a document launch instruction issued by a user, the executing subject reads a preset set of files, displays a launch identification of a user interface to which a HTML data file corresponds according to an inventory file in the set of files, and displays the user interface to which the HTML data file corresponds according to an operation of the user. Then, after the user triggers an operation identification of data to be edited included in the user interface, the executing subject calls a preset editing interface, loads the data to be edited according to identification information of the data to be edited, and presents to the user an editing user interface for the data to be edited. In comparison with the conventional art, a user does not need to first export data from a target information system manually, store the data locally, and then load said data by using corresponding office software, thus embodiments of the invention, achieve more convenient operation and higher office efficiency. Furthermore, HTML is a standard technique of text format, which is independent from platform and hardware, thus embodiments of the invention can be executed on any software and hardware platform. Therefore, embodiments of the invention have wide applicability.

Figure 2:
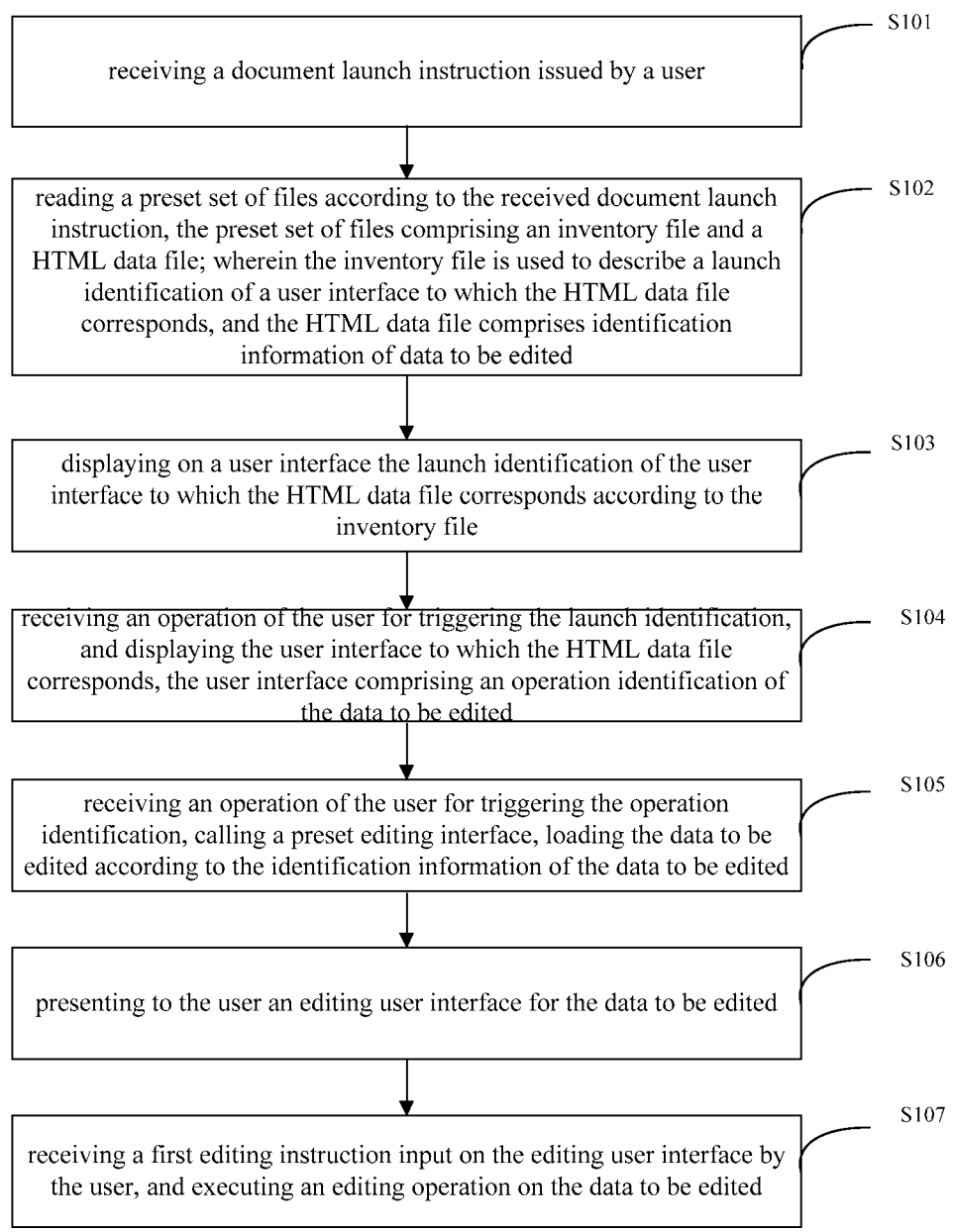
FIG. 2 is a flowchart of a second method for editing data according to an embodiment of the invention.

In an actual application, such as the embodiment shown in FIG. 1, after finishing S106, i.e., presenting to the user an editing user interface for the data to be edited, S107 can be executed, i.e., receiving a first editing instruction input on the editing user interface by the user, and executing an editing operation on the data to be edited, as shown in FIG. 2.

Executing an editing operation on the data to be edited is achieved, for example, by application functions provided by the related office software, such as text processing, image processing, or data processing, as non-limiting examples. The specific form of the editing operation is not specifically described here in the invention, and the embodiments thereof can be found with reference to the related office software in the conventional art.

During the actual application of various embodiments of the invention, the HTML data file further includes a preset editing instruction depending on different requirements.

According at least one embodiment of the invention, after loading the data to be edited, the method further includes editing the data to be edited according to the preset editing instruction in the HTML data file to obtain a first editing result.

According at least one embodiment of the invention, presenting to the user an editing user interface for the data to be edited is specifically presenting to the user an editing user interface including the first editing result.

For example, when a user wants to import a document, after data of the document is loaded, first adding a watermark to the document according to a preset editing instruction, such as an editing instruction for adding a watermark, and then presenting the document to which a watermark has been added.

According at least one embodiment of the invention, after presenting to the user the editing user interface including the first editing result, the method further includes receiving a second editing instruction input on the editing user interface by the user, and executing an editing operation on the data to be edited. Executing an editing operation on the data to be edited, according to an embodiment of the invention, is achieved by application functions provided by the related office software, such as text processing, image processing, or data processing, as non-limiting examples. The specific form of the editing operation is not specifically described here, the embodiments thereof can be found with reference to the related office software in the conventional art.

In each of the embodiments described above, the data to be edited is stored in a particular storage location in a target information system or in a local particular storage location.

According at least one embodiment of the invention, the particular storage location in the target information system or the local particular storage location described here can be preset by the target information system. For example, when the data to be edited is an electronic signature, the electronic signature is stored in the particular storage location in the target information system, or the electronic signature is also pre-designated by the target information system to be stored in the local particular storage location. When the electronic signature is designated by the target information system to be stored in the local particular storage location, it is selected as a file in the preset set of files, and then the preset set of files is stored in a storage location designated by the target information system and the related office software. However, wherever the data to be edited is stored, the HTML data file in the preset set of files will include the identification information of the data to be edited. As such, when calling the editing user interface, the executing subject can find the data to be edited according to the identification information thereof and load the data to be edited.

Figure 3:
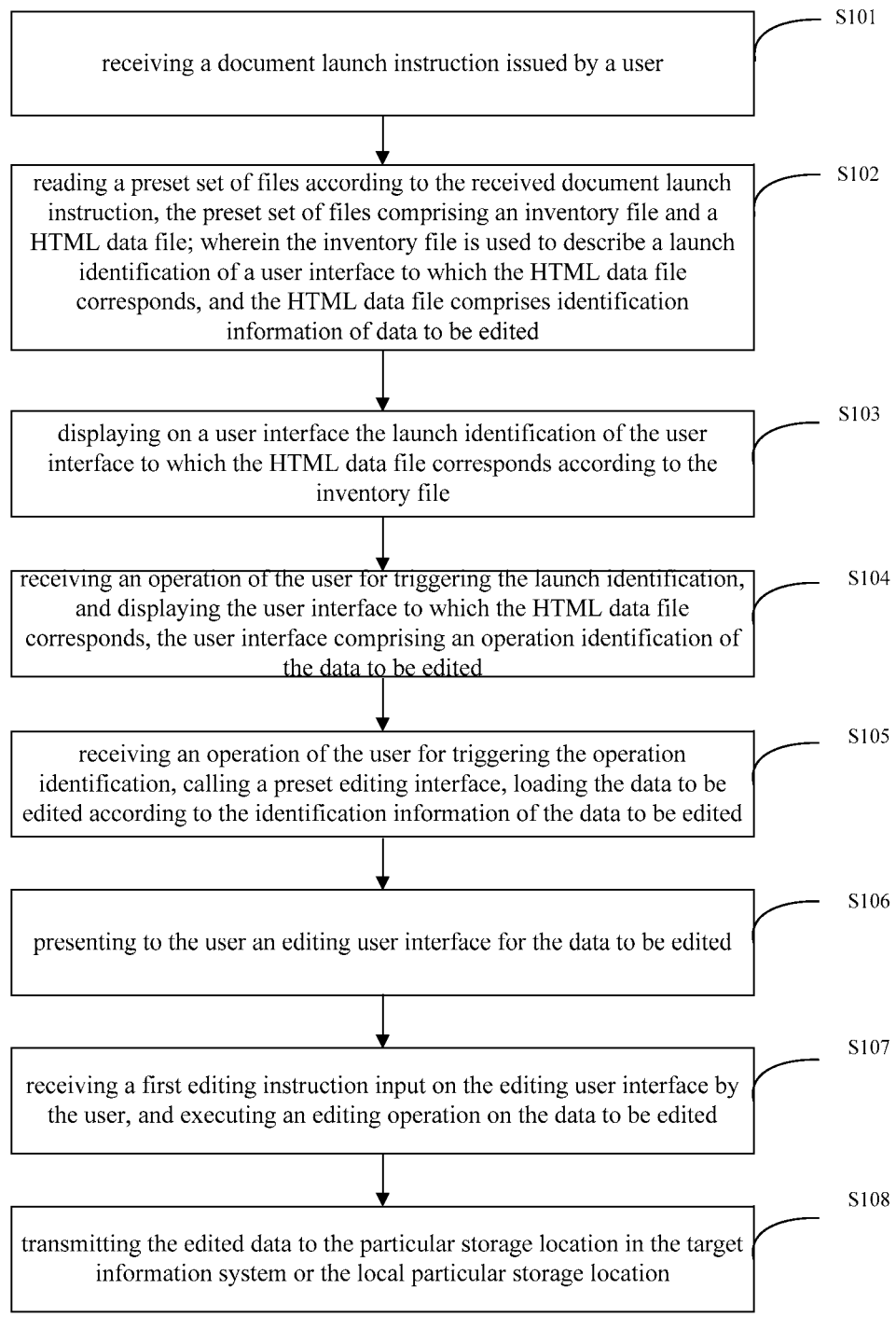
FIG. 3 is a flowchart of a third method for editing data according to an embodiment of the invention.

In the embodiments described above, such as the embodiment shown in FIG. 2, after S107, i.e., executing an editing operation on the data to be edited, is accomplished, S108 is performed, i.e., transmitting the edited data to the particular storage location in the target information system or the local particular storage location, as shown in FIG. 3.

Of course, it should be noted that, after executing the editing operation on the data to be edited, the other embodiments described above can include transmitting the edited data to the particular storage location in the target information system or the local particular storage location.

The embodiments of transmitting the edited data to the particular storage location in the target information system or the local particular storage location are achieved by using the related technical solutions in the conventional art, which is not specifically limited here in the invention.

In the embodiments described above, the editing operation is a persistent editing operation or a non-persistent editing operation.

According at least one embodiment of the invention, the persistent operation is an operation in which the editing operation executed by the user will be transmitted to the particular storage location in the target information system or the local particular storage location together with the edited data for being stored after the user edits the data to be edited. The non-persistent operation is an operation in which the editing operation executed by the user will not be transmitted to the particular storage location in the target information system or the local particular storage location together with the edited data for being stored after the user edits the data to be edited.

For example, in the example of inserting an electronic signature described above, the inserting operation is a persistent operation, in which the electronic signature and the document to which the electronic signature is inserted will be transmitted to the particular storage location in the target information system or the local particular storage location for being stored.

According at least one embodiment of the invention, when a user wants to open a confidential document in the information system for viewing, then an editing instruction for adding a watermark will be preset in the HTML data file in the corresponding preset set of files. The text of the watermark is, for example, a word of "confidential". The editing operation to which the editing instruction corresponds is, for example, a non-persistent operation, as such the executing subject will execute the editing instruction for adding a watermark after loading this confidential document, so that the document displayed will comprise the word of "confidential"; however, after the user finishes viewing the document, the document will be transmitted back to the particular storage location in the target information system or the local particular storage location for being stored. However, the operation of adding a watermark will not be transmitted to the particular storage location in the target information system or the local particular storage location together with this document for being stored. In other words, the stored document still has no watermark.

Figure 4:
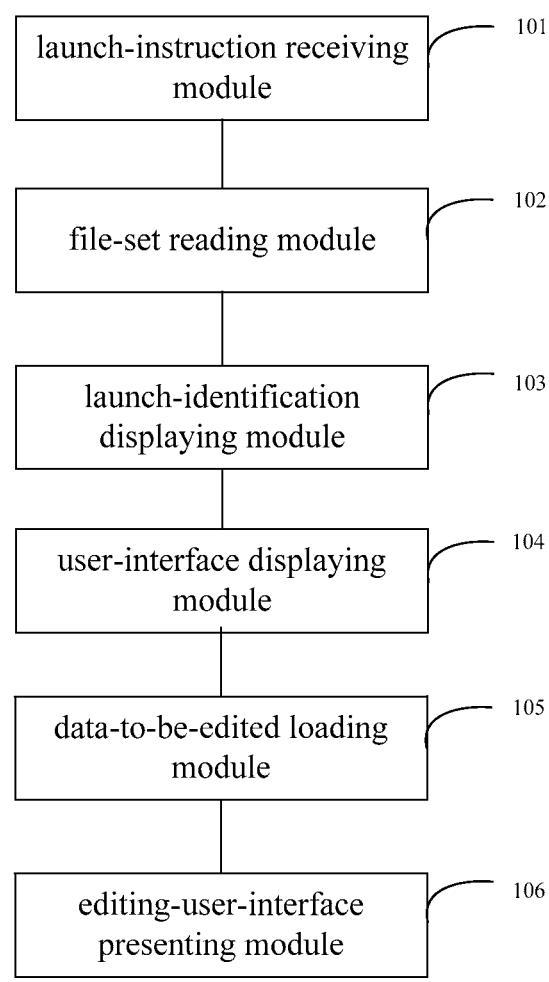
FIG. 4 is a schematic structural diagram of a first device for editing data according to an embodiment of the invention.

Corresponding to the embodiments of the method above, the present invention further provide a device for editing data, as shown in FIG. 4, which includes a launch-instruction receiving module 101, which is used to receive a document launch instruction issued by a user, a file-set reading module 102, which is used to read a preset set of files according to the received document launch instruction, the preset set of files including an inventory file and a HTML data file, wherein the inventory file is used to describe a launch identification of a user interface to which the HTML data file corresponds, and the HTML data file includes identification information of data to be edited.

According at least one embodiment of the invention, the device further includes a launch-identification displaying module 103, which is used to display on a user interface the launch identification of the user interface to which the HTML data file corresponds according to the inventory file. Further, the device includes a user-interface displaying module 104, which is used to receive an operation of the user for triggering the launch identification, and displays the user interface to which the HTML data file corresponds, the user interface including an operation identification of the data to be edited. Further, the device includes a data-to-be-edited loading module 105, which is used to receive an operation of the user for triggering the operation identification, call a preset editing interface, and load the data to be edited according to the identification information of the data to be edited. The device further includes an editing-user-interface presenting module 106, which is used to present to the user an editing user interface for the data to be edited.

It can be known from the above description that, after receiving a document launch instruction issued by a user, the executing subject can read a preset set of files, display a launch identification of a user interface to which a HTML data file corresponds according to an inventory file in the set of files, and display a user interface to which the HTML data file corresponds according to an operation of the user. Then, after the user triggers an operation identification of data to be edited comprised in the user interface, the executing subject calls a preset editing interface, loads the data to be edited according to identification information of the data to be edited, and presents to the user an editing user interface for the data to be edited. In comparison with the conventional art, a user does not need to first export data from a target information system manually, store the data locally, and then load said data by using corresponding office software, thus embodiments of the invention achieve more convenient operation and higher office efficiency. Furthermore, HTML is a standard technique of text format, which is independent from platform and hardware, thus it can be executed on any software and hardware platform. Therefore, embodiments of the invention have wide applicability.

Figure 5:
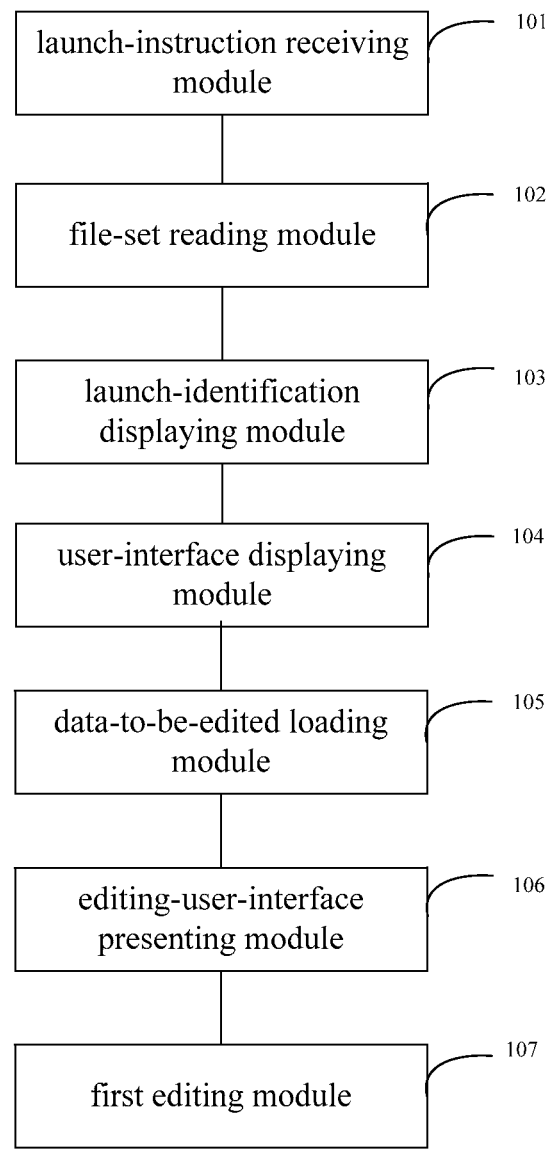
FIG. 5 is a schematic structural diagram of a second device for editing data according to an embodiment of the invention.
Figure 6:
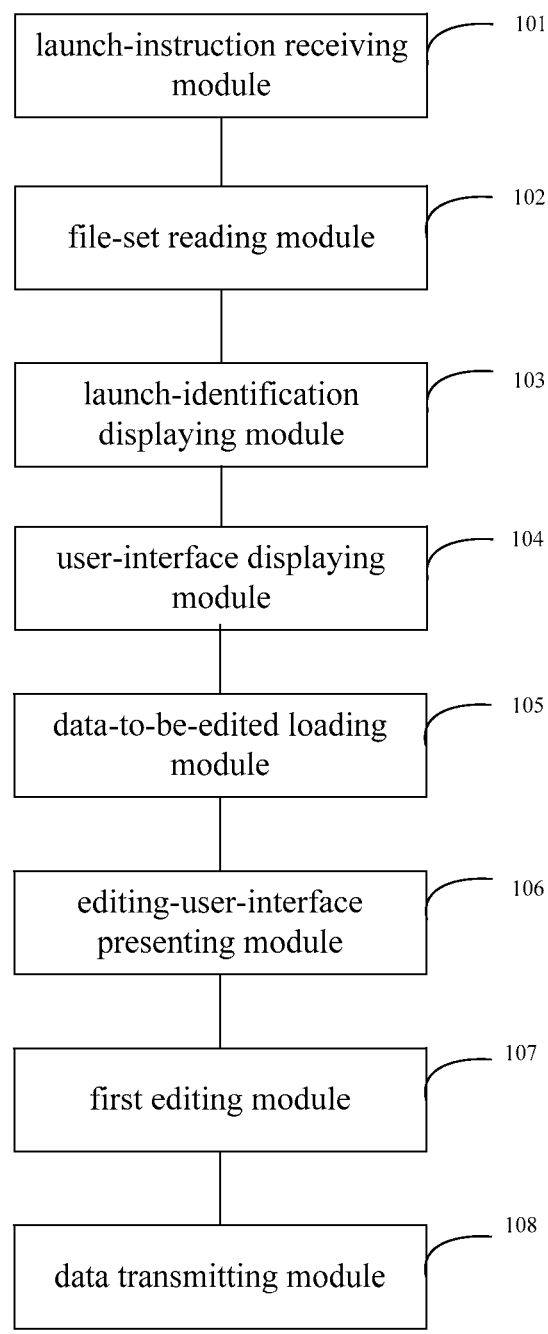
FIG. 6 is a schematic structural diagram of a third device for editing data according to an embodiment of the invention.

In a preferred embodiment of the invention, the device as shown in FIG. 4 further includes a first editing module 107, which is used to receive a first editing instruction input on the editing user interface by the user and execute an editing operation on the data to be edited after the editing user interface for the data to be edited is presented to the user by the editing-user-interface presenting module 106, as shown in FIG. 5.

In an actual application, in order to meet different requirements, the device as shown in FIG. 4 further includes a pre-editing module, and the HTML data file further includes a preset editing instruction, the pre-editing module is used to edit the data to be edited according to the preset editing instruction in the HTML data file after the data to be edited is loaded by the data-to-be-edited loading module 105 to obtain a first editing result, and the editing-user-interface presenting module 106 is specifically used to present to the user an editing user interface comprising the first editing result.

In accordance with an embodiment in which a pre-editing module is involved described above, the device further includes a second editing module, which is used to receive a second editing instruction input on the editing user interface by the user and execute an editing operation on the data to be edited after the editing user interface comprising the first editing result is presented to the user by the editing-user-interface presenting module 106.

In each of the embodiments described above, the data to be edited is stored in a particular storage location in a target information system or a local particular storage location. The detailed description of this can be found with reference to description of corresponding sections of the embodiments of the method, and is omitted here in the invention.

In each of the embodiments of device described above, the device further includes, for example, a data transmitting module, which is used to transmit the edited data to the particular storage location in the target information system or the local particular storage location after the editing operation on the data to be edited is executed by the pre-editing module, the first editing module or the second editing module.

For example, as shown in FIG. 5, the device further includes, for example, a data transmitting module 108. The data transmitting module 108 transmits the edited data to the particular storage location in the target information system or the local particular storage location after the editing operation on the data to be edited is executed by the first editing module 107.

In each of the embodiments described above, the editing operation is a persistent editing operation or a non-persistent editing operation. The description of the persistent editing operation or the non-persistent editing operation can be found with reference to description of corresponding sections of the embodiments of the method, and is omitted here in the invention.

It will be understood by one of ordinary skills in the art that all or part of the steps in the embodiments which implement the method described above can be implemented by instructing the related hardware with programs which can be stored in a computer readable storage medium such as ROM/RAM, magnetic disk or an optical disk, as non-limiting examples.

Terms used herein are provided to explain embodiments, not limiting the invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the invention may suitably comprise, consist or consist essentially of the elements disclosed and may be practiced in the absence of an element not disclosed. According to at least one embodiment, it can be recognized by those skilled in the art that certain steps can be combined into a single step.

The terms and words used in the specification and claims should not be interpreted as being limited to typical meanings or dictionary definitions, but should be interpreted as having meanings and concepts relevant to the technical scope of the invention based on the rule according to which an inventor can appropriately define the concept of the term to describe the best method he or she knows for carrying out the invention.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, it will be understood that unless a term such as 'directly' is not used in a connection, coupling, or disposition relationship between one component and another component, one component may be 'directly connected to', 'directly coupled to' or 'directly disposed to' another element or be connected to, coupled to, or disposed to another element, having the other element intervening therebetween.

As used herein, the terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "according to an embodiment" herein do not necessarily all refer to the same embodiment.

Ranges may be expressed herein as from about one particular value, and/or to about another particular value. When such a range is expressed, it is to be understood that another embodiment is from the one particular value and/or to the other particular value, along with all combinations within said range.

Although the invention has been described in detail, it should be understood that various changes, substitutions, and alterations can be made hereupon without departing from the principle and scope of the invention. Accordingly, the scope of the invention should be determined by the following claims and their appropriate legal equivalents.

What is claimed is:

1. A method for, in an electronic device, processing and editing data in a target information system then uploading results of the processing and editing, the target information system is not local to the electronic device, wherein the method comprises the steps of:

receiving, by a plug-in of a related office software, a document launch instruction issued by a user, wherein the document launch instruction is an operation issued by the user for launching related office software, or an operation of the user for triggering a preset document launch icon on the user interface of the related office software in the case that the related office software is already launched, wherein the related office software is installed in the electronic device;

reading, by the plug-in of the related office software, data including a preset set of files according to the received document launch instruction, the preset set of files comprising an inventory file and a HTML data file; wherein the inventory file is used to describe a launch identification of a user interface to which the HTML data file corresponds, and the HTML data file comprises identification information of data to be edited, wherein, the preset set of files is provided by the target information system in advance and is stored in a location pre-designated by the target information system and related office software, wherein the HTML data file is an intermediate tool to achieve editing data to be edited in the target information system, and the inventory file is used to provide a plurality of icons along with their titles, upon clicking on which icons, the interface corresponding to HTML data file will be displayed;

displaying, by the plug-in of the related office software, on a user interface the launch identification of the user interface to which the HTML data file corresponds according to the inventory file;

receiving, by the plug-in of the related office software, an operation of the user for triggering the launch identification, and displaying the user interface to which the HTML data file corresponds, the user interface comprising an operation identification of the data to be edited, wherein, the data to be edited is stored in a particular storage location in the target information system or a local particular storage location;

receiving, by the plug-in of the related office software, an operation of the user for triggering the operation identification, calling a preset editing interface of the related office software, loading the data to be edited according to the identification information of the data to be edited in the preset editing interface without exporting the data to be edited from the target information system manually and storing the data to be edited in the electronic device locally, and presenting to the user an editing user interface for the data to be edited by means of application functions of the related office software;

after presenting to the user the editing user interface for the data to be edited, the method further comprises receiving, by the plug-in of the related office software, a first editing instruction input on the editing user interface by the user, and executing an editing operation on the data to be edited; and after executing the editing operation on the data to be edited, uploading, by the plug-in of the related office software, results of the processing and editing of the data and transmitting the edited data to the particular storage location in the target information system or the local particular storage location, wherein the editing operation is a persistent editing operation or a non-persistent editing operation, the persistent editing operation is a editing operation that will be transmitted to the particular storage location in the target information system or the local particular storage location together with the edited data for being stored; the non-persistent editing operation is a editing operation that will not be transmitted to the particular storage location in the target information system or the local particular storage location together with the edited data for being stored;

when the user opens a confidential document, a preset editing operation for adding a watermark will be executed on the confidential document, while the editing operation for adding a watermark will not be transmitted to the particular storage location in the target information system or the local particular storage location together with the confidential document for being stored.

2. The method as claimed in claim 1, wherein the HTML data file further comprises a preset editing instruction;

after loading the data to be edited, the method further comprises editing the data to be edited according to the preset editing instruction in the HTML data file, so as to obtain a first editing result; and said presenting to the user an editing user interface for the data to be edited is specifically presenting to the user an editing user interface comprising the first editing result.

3. The method as claimed in claim 2, wherein, after presenting to the user the editing user interface comprising the first editing result, the method further comprises receiving a second editing instruction input on the editing user interface by the user, and executing an editing operation on the data to be edited.

4. An electronic device, comprising:
a processor and a memory, wherein a plurality of executable modules including a launch-instruction receiving module, a file-set reading module, a launch-identification displaying module, a user-interface displaying module, a data-to-be-edited loading module, an editing-user-interface presenting module, a first editing module and a data transmitting module are stored in the memory, which can be executed by the processor for editing data in a target information system and then uploading results of the processing and editing, the target information system is not local to the electronic device, wherein, the launch-instruction receiving module, is executed to receive a document launch instruction issued by a user, wherein the document launch instruction is an operation issued by the user for launching related office software, or an operation of the user for triggering a preset document launch icon on the user interface of the related office software in the case that the related office software is already launched, wherein the related office software is installed in the electronic device;

the file-set reading module, is executed to read data including a preset set of files according to the received document launch instruction, the preset set of files comprising an inventory file and a HTML data file; wherein the inventory file is used to describe a launch identification of a user interface to which the HTML data file corresponds, and the HTML data file comprises identification information of data to be edited, wherein, the preset set of files is provided by the target information system in advance and is stored in a location pre-designated by the target information system and related office software, wherein the HTML data file is an intermediate tool to achieve editing data to be edited in the target information system, and the inventory file is used to provide a plurality of icons along with their titles, upon clicking on which icons, the user interface corresponding to the HTML data file will be displayed;

the launch-identification displaying module, is executed to display on a user interface the launch identification of the user interface to which the HTML data file corresponds according to the inventory file;

the user-interface displaying module, which is used to receive an operation of the user for triggering the launch identification, and display the user interface to which the HTML data file corresponds, the user interface comprising an operation identification of the data to be edited, wherein, the data to be edited is stored in a particular storage location in the target information system or a local particular storage location;

the data-to-be-edited loading module, is executed to receive an operation of the user for triggering the operation identification, call a preset editing interface of the related office software, and load the data to be edited according to the identification information of the data to be edited in the preset editing interface without exporting the data to be edited from the target information system manually and storing the data to be edited in the electronic device locally;

the editing-user-interface presenting module, is executed to present to the user an editing user interface for the data to be edited;

the first editing module is executed to receive a first editing instruction input on the editing user interface by the user and execute an editing operation on the data to be edited by means of application functions of the related office software after the editing user interface for the data to be edited is presented to the user by the editing-user-interface presenting module; and the data transmitting module is executed to upload results of the processing and editing of the data and to transmit the edited data to the particular storage location in the target information system or the local particular storage location after the editing operation on the data to be edited is carried out by the pre-editing module, the first editing module or the second editing module, wherein the editing operation is a persistent editing operation or a non-persistent editing operation, the persistent editing operation is a editing operation that will be transmitted to the particular storage location in the target information system or the local particular storage location together with the edited data for being stored; the non-persistent editing operation is a editing operation that will not be transmitted to the particular storage location in the target information system or the local particular storage location together with the edited data for being stored;

when the user opens a confidential document, a preset editing operation for adding a watermark will be executed on the confidential document, while the editing operation for adding a watermark will not be transmitted to the particular storage location in the target information system or the local particular storage location together with the confidential document for being stored.

5. The electronic device as claimed in claim 4, wherein a pre-editing module is also stored in the memory, and the HTML data file further comprises a preset editing instruction;

the pre-editing module is executed to edit the data to be edited according to the preset editing instruction in the HTML data file after the data to be edited is loaded by the data-to-be-edited loading module, so as to obtain a first editing result; and the editing-user-interface presenting module is further executed to present to the user an editing user interface comprising the first editing result.

6. The electronic device as claimed in claim 5, wherein a second editing module is also stored in the memory, which is executed to receive a second editing instruction input on the editing user interface by the user and execute an editing operation on the data to be edited after the editing user interface comprising the first editing result is presented to the user by the editing-user-interface presenting module.

* * * * *